(12) United States Patent
Srinivasan et al.

(10) Patent No.: US 8,077,662 B2
(45) Date of Patent: Dec. 13, 2011

(54) METHODS AND APPARATUS FOR COORDINATING NETWORK MONITORING AND/OR AUTOMATING DEVICE CONFIGURATIONS BASED ON MONITORING RESULTS

(75) Inventors: Murari Srinivasan, Palo Alto, CA (US); Amit Butala, Sunnyvale, CA (US); Yashodhan Dandekar, Sunnyvale, CA (US); Sayandev Mukherjee, Santa Clara, CA (US)

(73) Assignee: Spidercloud Wireless Inc., Santa Clara, CA (US)

( * ) Notice: Subject to any disclaimer, the term of this patent is extended or adjusted under 35 U.S.C. 154(b) by 0 days.

(21) Appl. No.: 12/487,277

(22) Filed: Jun. 18, 2009

(65) Prior Publication Data

US 2009/0316585 A1 Dec. 24, 2009

Related U.S. Application Data

(60) Provisional application No. 61/073,747, filed on Jun. 18, 2008.

(51) Int. Cl.
*H04W 4/00* (2009.01)
(52) U.S. Cl. ........................................................ 370/328
(58) Field of Classification Search ........... 370/328–339
See application file for complete search history.

(56) References Cited

U.S. PATENT DOCUMENTS

| 7,096,021 | B1 | 8/2006 | Lehtinen et al. |
| 7,277,414 | B2 * | 10/2007 | Younis et al. .................. 370/338 |
| 7,817,997 | B2 * | 10/2010 | Nylander et al. ........... 455/422.1 |
| 2005/0277415 | A1 | 12/2005 | Hamalainen et al. |
| 2007/0149194 | A1 * | 6/2007 | Das et al. ....................... 455/436 |
| 2007/0197243 | A1 | 8/2007 | Nientiedt |

OTHER PUBLICATIONS

Written Opinion of the International Searching Authority, dated Jan. 29, 2010, for International Application No. PCT/US2009/047713, which was filed on Jun. 17, 2009, pp. 1-3.
International Search Report, dated Jan. 29, 2010, for International Application No. PCT/US2009/047713, which was filed on Jun. 17, 2009, pp. 1-3.

* cited by examiner

*Primary Examiner* — Frank Duong (57) ABSTRACT

Methods and apparatus are described that enable a deployment of a system of wireless nodes, e.g., femtocells, which can self-configure themselves into a balanced and optimized wireless network. In various embodiments, access points switch between a network monitoring mode in which network monitoring is performed and a communications mode in which the access point serves one or more wireless terminals and communicates traffic data to/from the wireless terminals. Traffic data transmission to wireless terminals are not supported in network monitoring mode. Based on information gathered from one or more access nodes while they operating in network monitoring mode of operation, access point configuration information is generated and one or more access points are automatically configured.

40 Claims, 9 Drawing Sheets

METHODS AND APPARATUS FOR COORDINATING NETWORK MONITORING AND/OR AUTOMATING DEVICE CONFIGURATIONS BASED ON MONITORING RESULTS

RELATED APPLICATION

This application claims the benefit of the filing date of U.S. Provisional Application No. 61/073,747, filed on Jun. 18, 2008, and entitled "METHODS AND APPARATUS FOR COORDINATING NETWORK MONITORING AND/OR AUTOMATING DEVICE CONFIGURATIONS BASED ON MONITORING RESULTS," and which is hereby expressly incorporated by reference in its entirety.

FIELD

The present application relates to network monitoring and configuration and, more particularly, to method and apparatus which can be used to facilitate and/or automate set up and configuration of devices such as access points, e.g., femtocell access points, in a network supporting wireless communications.

BACKGROUND

In conventional cellular networks, access points, also sometimes referred to as base stations, are normally installed and commissioned after a careful upfront planning and survey process. The terms access points and base stations are used in the present application interchangeably and are not intended to be limited to a specific type of access point or base station. Post installation, extensive optimization efforts are often undertaken to maximize the performance of the network. Such optimization may also involve a considerable amount of "drive testing" using special test mobiles to collect data on network performance at a variety of geographical locations. This data is then post-processed and analyzed to determine inputs for optimization. These optimization steps typically involve power adjustments and antenna tilt adjustments.

There is a growing trend towards deployment of cellular infrastructure in the conventional macro cellular mode as well as local area (LAN) mode. In the latter deployment mode, installation procedures are often less planned than macrocellular deployments. Base stations, or access points, are often sited based on considerations of power and network connectivity availability and based on ease of mounting. For example, access points may be installed on ceiling tiles, walls, or even on outdoor mounting assets for campus deployments. In such deployments, ease of installation and tuning can be important to successful deployment and use.

While in conventional cellular networks, the cost of "drive testing" and other costly and time intensive measurement approaches may be justified given the large number of devices being served by a single cell site in the local area mode where cell sites tend to be much smaller with access being limited to a particular group of people, e.g., employees of a company, university, etc., such costly procedures may not be justifiable from a cost and time perspective. However, improperly deployed cell sites operating in a local area mode or very small cell, providing access to a limited set of people as opposed to the public, may create interference to cell sites serving the general public since they may share the same licensed spectrum.

Accordingly there is a need for methods and apparatus for simplifying deployment and tuning of system configuration settings of small cell sites, e.g., cell sites operating in a local area mode of operation. In addition to facilitating initial set up, there is also a need for methods and apparatus which can facilitate network self optimization without the need for drive-testing and other such conventional methods of network optimization which do not scale well and can be costly to implement.

SUMMARY

The methods and apparatus of the present invention can be used to facilitate and/or automate various access point set up, configuration and optimization operations. The methods and apparatus are particularly well suited for use in local area cell sites and/or other small cell site deployments where the cost and time of drive testing and/or other costly testing procedures may not be commercially practical, e.g., because of the limited number of people being served by one or more sites.

While the methods and apparatus of the present invention are particularly well suited for use in deploying, configuring and optimizing small cell sites, the techniques are not limited to such applications and can be used in larger cellular network to facilitate deployment, configuration and optimization of large cell sites.

In at least one exemplary embodiment, a wireless system comprises multiple wireless infrastructure elements, and a control device. The control device may be, e.g., one of: a central controller, a peer access point, and a coordinating access point. Each wireless infrastructure element will be referred to as an access point (AP), while the controlling entity, while describing various embodiments, will be called an access controller (AC). While the term access controller is used, it should be appreciated that in some embodiments, e.g., such as those where the controller is a peer device, the control device may not perform access control functions. However in other embodiments the controller performs both access point mode control, access point configuration control, and access control functions. The access points will typically be connected to the access controller through a wired backhaul network, for example a gigabit Ethernet network, fiber-optic network or other type of high capacity data connection. However, in some embodiments one or more of the AP's are connected to the AC using a wireless backhaul network. The ability of AP's to send control or data messages directly between each other is a desirable property, although the innovations described in this document do not depend on this property and thus various embodiments do not require this feature. The AC knows the identity of, and to be able to exchange messages with each AP or is able to determine the identifying of the APs via various known discovery techniques. Wireless terminals, e.g., mobile nodes, communicate with one another via an AP to which they are connected, e.g., by a wireless link. WT's connected to different APs may communicate with signals being passed between the APs to which the WTs are connected and the backhaul connection between APs and/or the AC.

While an AC is used in some embodiments, it is not necessary to the invention and the methods and apparatus of the invention can be used in systems which do not utilize centralized controllers. Thus it should be appreciated that embodiments, such as a system deployment that has no controller but comprises distributed wireless access points, which can communicate in a peer-to-peer manner, are also contemplated and made possible by various methods and apparatus described herein.

In some embodiments, the geographical locations of the access points are known to the controller as well as the access points. This information can be used in interpreting measurements and generating a monitoring schedule used to control APs to switch between communication and monitoring modes of operation.

While this description could characterize a traditional macro cellular network, it is perhaps even more useful in a local area network implementation. The methods and apparatus described here are not constrained by the actual choice of wireless protocol technology, although they may apply more readily to certain technologies, and certain deployment topologies.

While the methods and apparatus described herein are particularly useful in applications where licensed spectrum is being used for communications purposes, the methods and apparatus can also be used with unlicensed-spectrum technologies such as WiFi to improve system deployments and configuration of various APs in the system.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
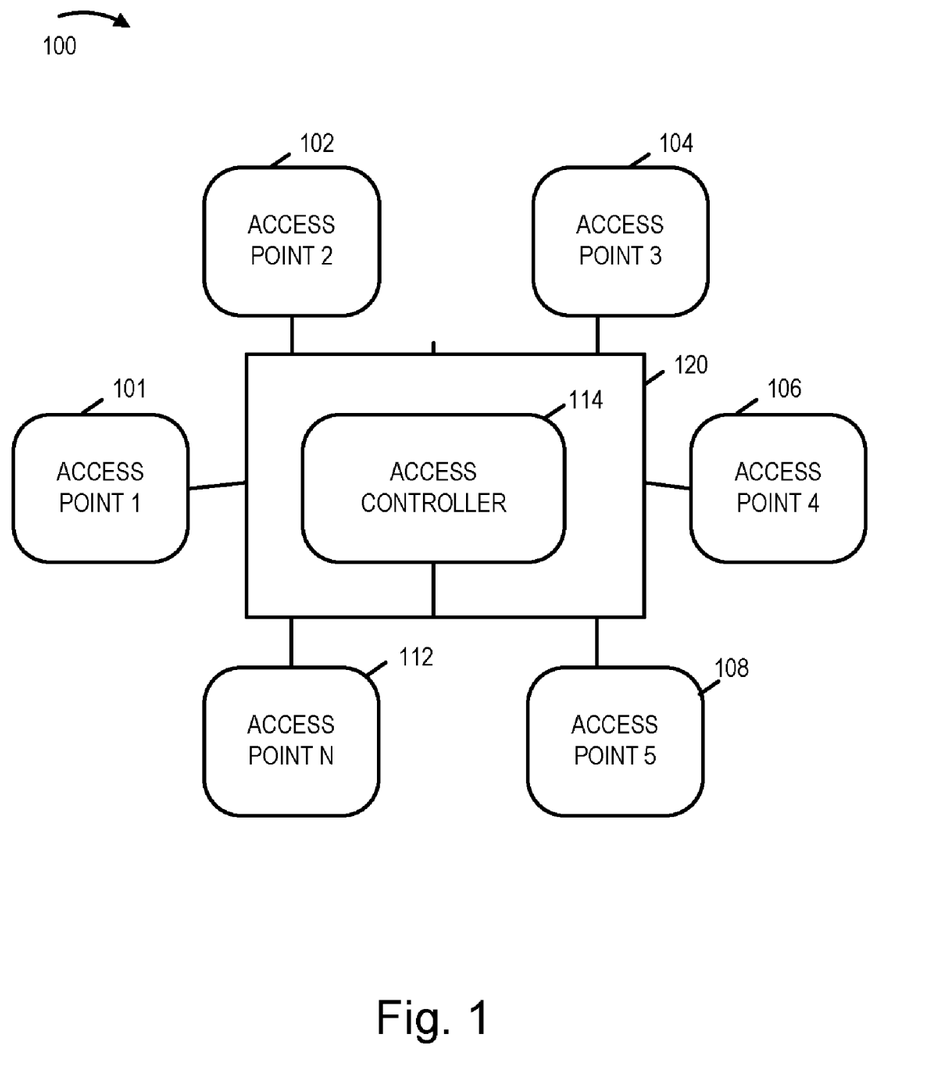
FIG. 1-3 illustrate an exemplary system implemented in accordance with an exemplary embodiment.

Various exemplary methods and apparatus will be described in the context of the preferred embodiment of the system, which comprises of multiple wireless access points, each of which is connected to a controller. FIG. 1 illustrates an exemplary system 100 of this type. The system 100 includes a plurality of access points including access point 1 101, access point 2 102, access point 3 104, access point 4 106, access point 5 108, . . . , and access point N 112. The access controller 114 is shown connected to the access points as shown using reference number 120. The connections between the access points 101, 102, . . . , 112 and the controller 114 could be dedicated, or the access points and the controller could all be connected to one network, say a gigabit Ethernet.

In this section, we describe different versions of a "measurement mode" of operation for the preferred embodiment of the system. The objective of this mode is to take measurements that yield an accurate picture of the coverage and interference experienced by users at different locations in the system.

In some embodiments, the AP's that are actively taking measurements will be in measurement mode, others may be in operational mode.

When an access point is first powered on, it goes into a measurement mode and monitors the network. In the sequel, we also refer to this mode as the "network monitor mode" of operation. It may decode distinctive waveforms that are transmitted by other access points in the vicinity, such as beacons or pilots. It may measure the signal strengths corresponding to these distinctive waveforms. The access points or base stations detected in this manner may be part of the same system under deployment, or may belong to other systems such as an outdoor macrocellular network.

Figure 2:
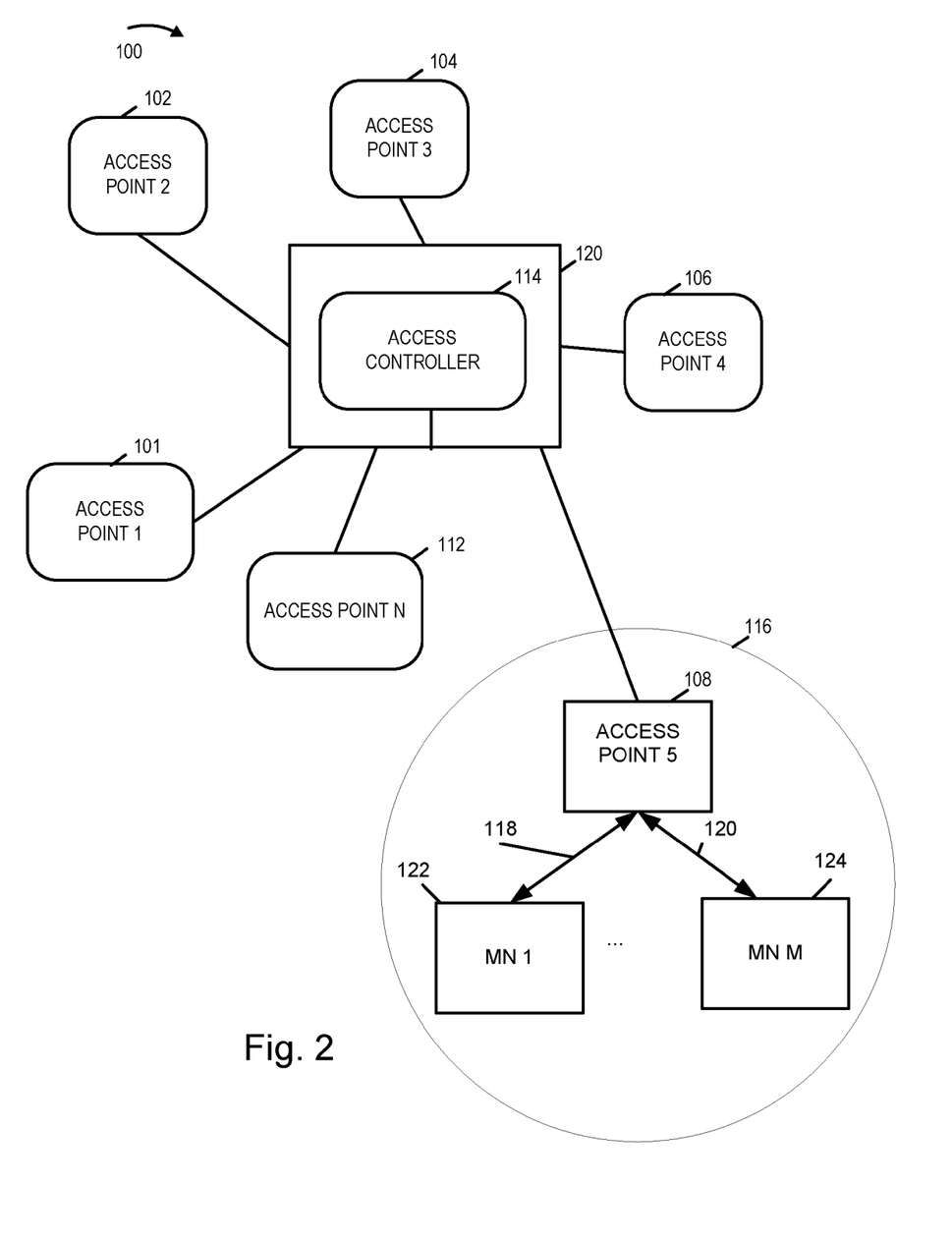

In the preferred embodiment, the controller 114 places the AP's in a measurement mode in a coordinated manner in order to configure parameters such as downlink power levels, uplink interference targets etc. The AC may adopt several different techniques to achieve this. In one example, the controller 114 may place a single AP to be in normal operational mode while every other AP is in network monitor mode as illustrated in FIG. 2. In other examples, the AC 114 may place several AP's in normal operational mode, while the remaining AP's are set to network monitor mode.

The measurements and other information decoded by the AP's that are in network monitor mode is synthesized by the AC 114. As a result of this synthesis, configuration information such as downlink power levels or uplink interference targets is generated for the entire set of AP's.

In a peer-to-peer scenario or embodiment without a controller, the AP's may collaboratively determine a network monitor schedule through mutual message exchange. Synthesis of the measured data may also be performed in a distributed manner after the measurements are exchanged. Alternatively, the AP's could designate a subset of the AP's to serve as coordination or synthesis agents.

Wireless systems of this nature benefit from periodic re-tuning and optimization. In the preferred embodiment, the controller 114 is capable of collecting information from each of the access points. For instance, it may collect information on use patterns and network load. It may, for example, infer that a certain cluster of access points sees zero load at night-time.

The controller 114 can opportunistically select specific access points and configure them to switch to network monitor mode. It may use a variety of criteria to make this selection. Any access point that is switched into network monitor mode scans the communication channels and measures the signal conditions on these channels. For instance, in one embodiment, an access point in network monitor mode may measure the downlink transmissions from neighboring access points. The controller may, in such cases, configure the access point with a specific neighbor list of access points whose distinctive waveforms are to be detected and measured.

In a peer-to-peer embodiment, an AP may request one of its neighbor AP's to switch into network monitor mode. This decision may be made at random or on a pre-determined schedule. It may also be triggered by network conditions that indicate that measurements need to be performed.

In another embodiment, the access point may be listening to uplink transmissions from a collection of mobile terminals. It may perform a simple measurement such as characterizing the overall interference floor, or it may actually acquire the signal from each of a set of mobile terminals that could be specified by the controller. In such a scenario, it is possible that switching an access-point to network monitor mode affects the uplink behavior (for instance, this can happen with soft-handoff in a CDMA or WCDMA system). But, if the controller is deliberately switching specific access-points into network monitor mode, it can gauge the impact of uplink interference from specific mobile terminals upon specific access point receivers. In this mode, the AP may or may not be in normal operating mode in the downlink.

In some embodiments an access point that is placed in network monitor mode ceases to transmit, and therefore could cause a "coverage hole" in the network. To compensate for this, the controller may configure a higher transmit power in neighboring access points so that they "fill in" the geographical space that was covered by the access point in network monitor mode. Now, the access point in question is measuring increased signal strengths from its neighbors, and not the original signal strengths, but this is easily compensated for in the controller, which has knowledge of the power increases. In one embodiment, the controller 114 may even cycle through a series of power increases applied in a certain pattern across the neighbor access points, so that the access point in question can accurately measure the interference impact of each of the neighbors. The controller 114 may selectively shut down certain parts of the system, localized in geography, in order to enable precise measurements of signal propagation.

In a controller-less embodiment, the AP's may inform their neighbor AP's of their decision to switch to network monitor mode. This may prompt the neighbor AP's to increase their power. As long as the AP's responsible for coordination and synthesis of the measurements are aware of the schedule of power changes and measurements in network monitor mode, an accurate map of the RF conditions in the network may be derived.

Some deployments use more than one wireless channel. These may take the form of overlays, each of which is a frequency-reuse-of-one deployment, or may involve a partial-frequency-reuse deployment. In such scenarios, the controller 114 may place an access point in network monitor mode and configure it to cycle through the available channels one at a time in order to collect measurements across all the channels. During periods of low load, the controller 114 may selectively shut down parts of the system that are operating on a particular channel, enabling an access point in monitor mode to precisely measure signal propagation across the network in each of the channels.

FIG. 2 illustrates an embodiment where the communications system 100 is implemented in accordance with the invention, and in addition to the network elements shown in FIG. 1, system 100 further includes a plurality of mobile terminals or mobile nodes (MN) such as MN 1 122, . . . , MN M 124. In the system 100, multiple mobile terminals, MN 1 122 through MN M 124 communicate with the base station 108 through the use of communication signals 118, 120. Reference number 116 indicates the coverage area of access point 5 108. Each mobile terminal may correspond to a different mobile user and are therefore sometimes referred to as user terminals. The signals 118, 120 may be, e.g., OFDM signals. The access point 5, e.g., base station 108 and mobile stations 122, 124 each implement the method of the present invention. Thus, signals 118, 120 include signals of the type discussed above, which are transmitted in accordance with the invention.

Figure 3:
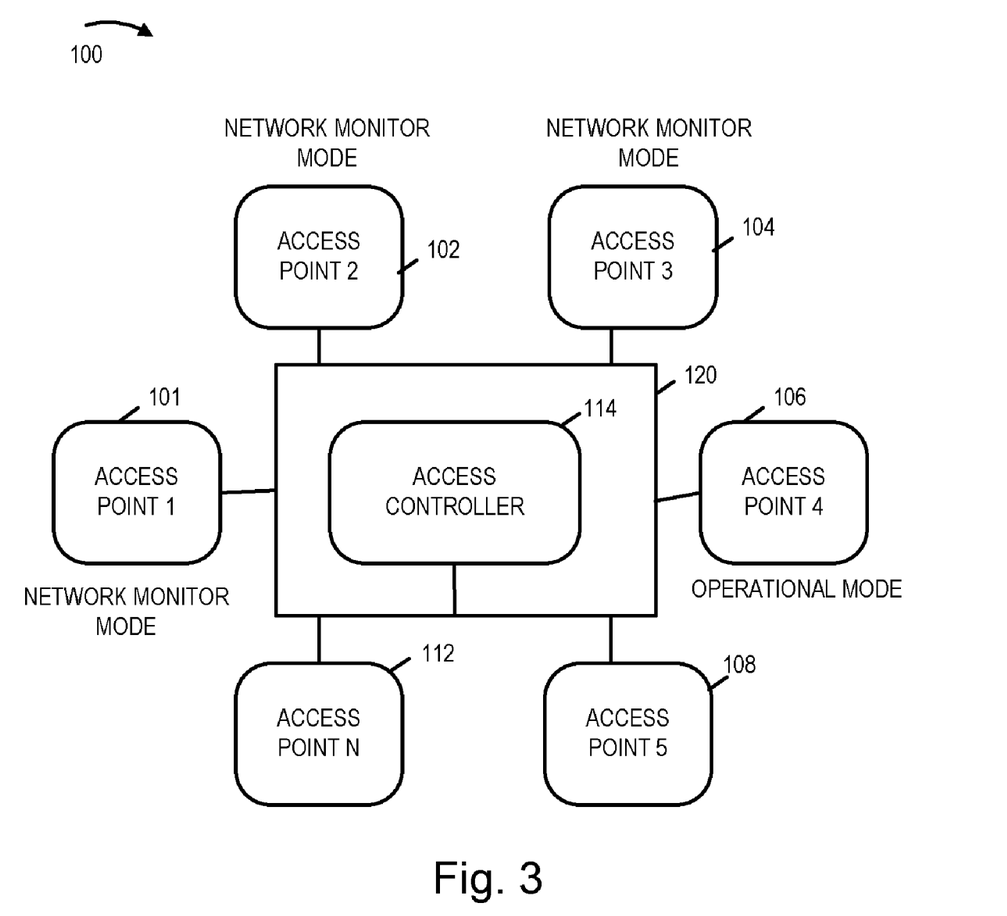

FIG. 3 illustrates an example where various access points of system 100 are shown to be operating in different modes of operation in accordance with one exemplary embodiment. AP 1 101, AP 2 102, AP 3 104 are shown to be operating in a network monitoring mode of operation, while AP 4 106 is indicated to be operating in the operational mode which is also referred to as the communications mode of operation. In the operational mode, communications with wireless terminals is supported and the access point operating in operational mode serves as an access point for wireless terminals in its coverage area. While in network monitoring mode, the access point monitors and collects information on signals sent to and/or transmitted by, one or more access points in the system, e.g., access points operating in the communications mode of operation. Monitoring mode operation of an access point may last for an extended period of time, e.g, tens, hundreds or even thousands of symbol transmission time periods or chips during which data transmissions may be monitored in addition to pilots and/or other signals that may be transmitted to or from one or more access points being monitored.

Figure 4:
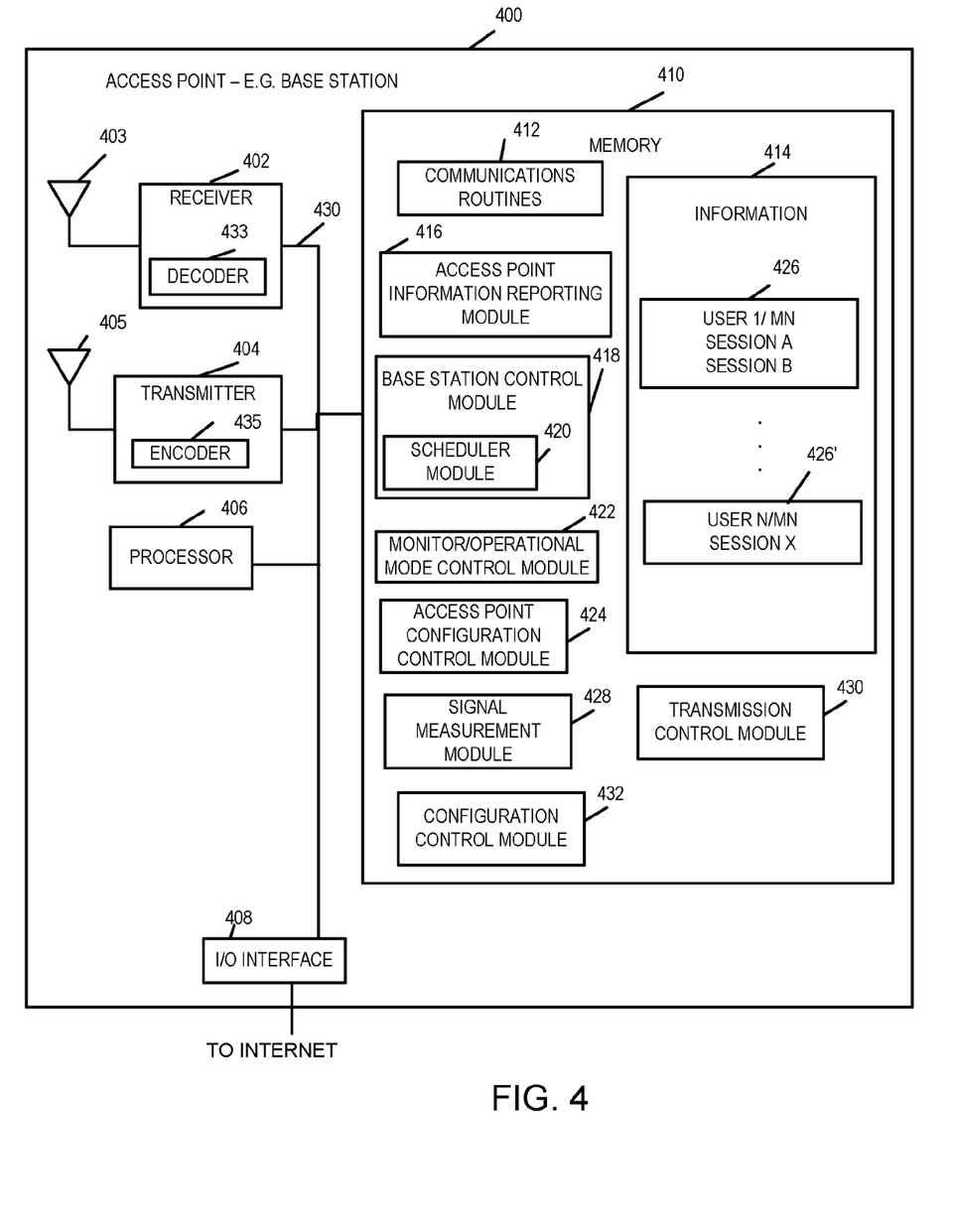
FIG. 4 illustrates an exemplary access point which may be used in the exemplary system of FIG. 1.

FIG. 4 illustrates an exemplary access point, e.g., base station 400, implemented in accordance with the invention. The base station 400 includes antennas 403, 405 and receiver, transmitter circuitry 402, 404. The receiver circuitry 402 includes a decoder 433 while the transmitter circuitry 404 includes an encoder 435. The circuitry 402, 404 is coupled by a bus 430 to an I/O interface 408, processor (e.g., CPU) 406 and memory 410. The I/O interface 408 couples the base station 400 to the Internet. The memory 410 includes routines and modules, which when executed by the processor 406, causes the base station 400 to operate in accordance with the invention. Memory includes communications routines 412 used for controlling the base station 400 to perform various communications operations and implement various communications protocols. The memory 410 also includes abase station control module 418 used to control the base station 400 to implement the steps of the method of the present invention described above in the sections which discuss Access point, e.g., base station, operation and signaling. The base station control module 418 includes a scheduling module 420 used to control transmission scheduling and/or communication resource allocation. Thus, module 420 may serve as a scheduler. Memory 410 also includes information used by communications routines 412, and control module 418. The information 414 includes an entry for each active mobile station user 426, 426' which lists the active sessions being conducted by the user and includes information identifying the mobile station (MT) being used by a user to conduct the sessions. As shown, in addition to the above described elements the memory 410 further includes an access point information reporting module 416, a monitoring/operational mode control module 422, an access point configuration control module 424, a signal measurement module 428, a transmission control module 430 and a configuration control module 432. The access point information reporting module 416 is responsible for generating information reports communicating information gathered during said monitoring mode of operation, e.g., to the central controller and/or another access point so that the information can be used in controlling system configuration including the configuration of one or more access points. The monitoring/operational mode control module 422 controls the access point 400 to operate in one of the network monitoring mode of operation and the communications mode of operation at any given point in time. The particular mode of operation to be used may be determined by the control module 422 based on a predetermined schedule, stored schedule information or a signal received from a control device instructing the access point to operate in a particular mode, e.g., network monitoring mode, during a particular period of time or to transition between network monitoring mode and a communications mode of operation. Signal measurement module 428 is used for taking measurements of received signals, e.g., signal strength and/or other measurements. Signal measurement module 428 may include a decoder and/or other circuitry for decoding received signals to determine if they are being transmitted to or from an access node being monitored. Signal measurement module 428 may determine or estimate signal or traffic loading on a particular access point and/or the interference from an access point being monitored for one or more possible antenna configurations supported by the access node. Transmission control module 430 controls the transmission of signals from the access point 400. When operating in network monitoring mode, the control module 430 may prevent the access point 400 from transmitting signals. Multiple access points 400 operating in network monitoring mode at a given point in time may measure signals from a single access point thereby determining the range or cell coverage area associated with the access point being monitored and/or other transmission characteristics including antenna transmission directivity thereby allowing optimization of the transmission characteristics based on the information obtained from the monitoring. Configuration control module 432 is responsible for controlling access point configuration including antenna directivity in some embodiments, transmission power levels, etc. Configuration control module 432 is responsive to information received from a control device indicating one or more access point configuration settings to be used and/or monitoring results obtained from other access points. Settings communicated by the control device and/or determined based on monitoring of the access point's transmissions may be intended to optimize the cell's coverage area, achieve load balancing between access points and/or limit interference caused to neighboring cells by transmissions from the access point 400.

Figure 5:
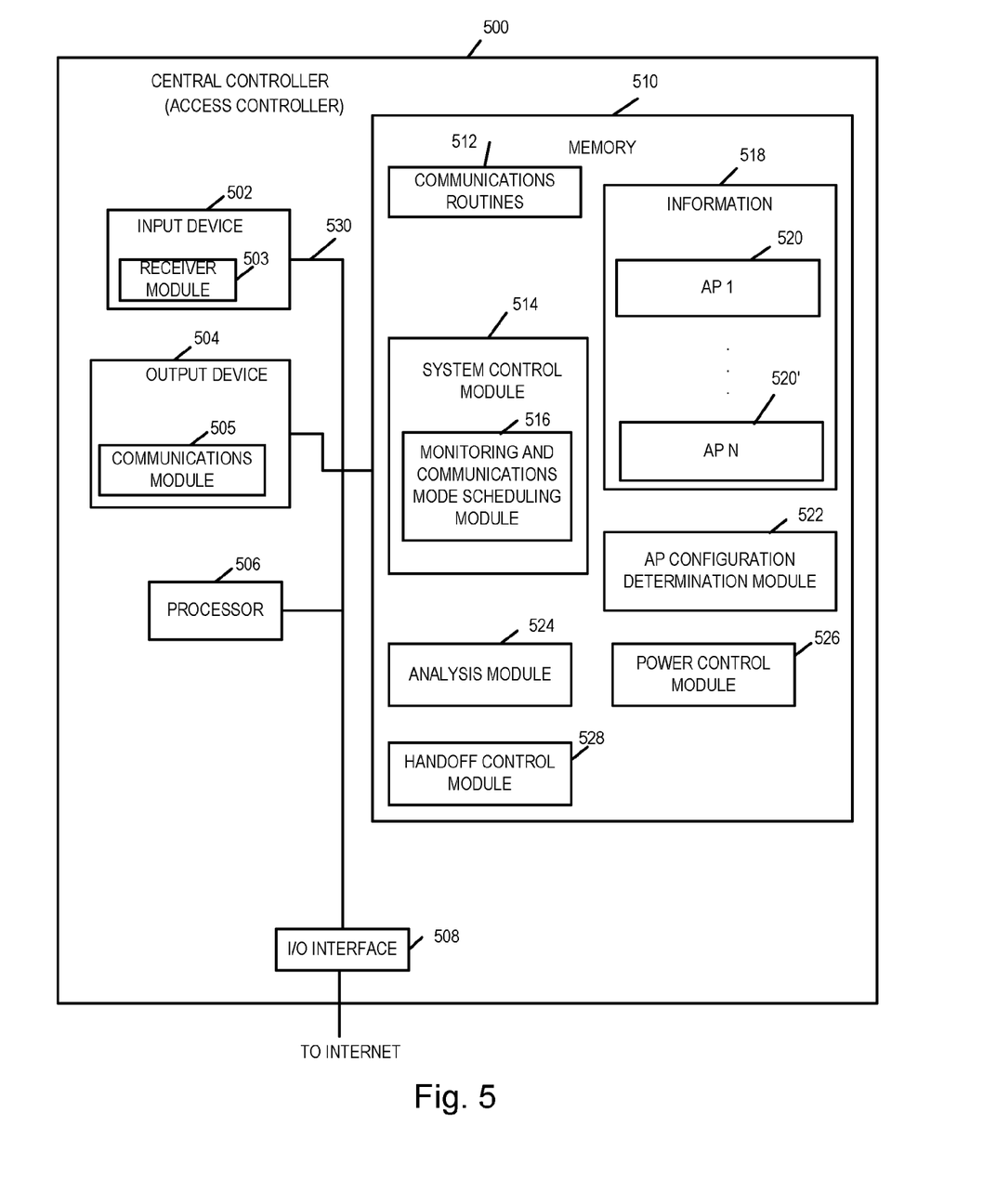
FIG. 5 illustrates an exemplary central controller which may be used in the exemplary system of FIG. 1.

FIG. 5 illustrates an access controller 500, e.g., a control device, implemented in accordance with the invention. The access controller 500 can be used as the access controller 114 of system 100. The access controller 500 includes input device 502 including a receiver module 503, and an output device 504 including a communications module 505 which may include a transmitter. The input and output devices 502, 504 are coupled by a bus 530 to an I/O interface 508, processor (e.g., CPU) 506 and memory 510. The I/O interface 508 couples the controller 500 to the Internet. The memory 510 includes routines and modules, which when executed by the processor 506, causes the access controller 500 to operate in accordance with the invention. The access controller 114 can communicate with access points via the input module and output module. Thus, access control 114 can receive information obtained from monitoring performed by one or more access points and can communicate information including operation mode commands and/or schedules to the access points.

As shown the memory 510 includes communications routines 512, a system control module 514 including a monitoring and communications mode scheduling module 516, an access point configuration determination module 522, an analysis module 524, a power control module 526 and a handoff control module 528. Memory further includes information 518, which includes sets of information 520 through 520', corresponding to various access points served by the access controller 500. The sets of information 520 through 520' each include e.g., interference, transmission power level, access point loading, antenna direction, geographic location and/or other information etc. corresponding to the particular access point to which the information set corresponds. Some of the information may be information received from an access point that was measured during a monitoring mode of operation while the access node to which the set of information corresponds was operating in a communications mode of operation. The communications routines 512 support various communications protocols and are used to facilitate communication between devices, e.g., the access points and central controller 500 using the supported communications protocols. The monitoring and communications mode scheduling module 516 schedule when particular access points should operate in a monitoring mode while another access point operates in a communications mode allowing the monitoring access point or points to obtain information on the access point operating in the communications mode of operation. The access point configuration determination module 522 determines, based on information received by the controller from access points operating in a monitoring mode, a suitable set of configuration parameters to be used by an access node which was subject to monitoring. The configuration parameters may control transmission power levels, antenna directivity and/or other things which can affect the coverage area provided by an access point, the shape of the coverage and/or the amount of interference which will be caused to neighboring access points.

Analysis module 524 is performs analysis on information received as a result of one or more access points operating in monitoring mode and determines one or more access point operating parameters which are then communicated to, and used by, an access point which was subject to monitoring thereby facilitating automatic configuration of one or more access points in the system. Power control module 526 is responsible for determining the transmission power to be used by one or more access points in cases where transmission power levels are not determined by the analysis mode. Handoff control module 528 is responsible for generating and communicating handoff control signals to one or more access points. Handoff control module 528 may instruct an access point which is to enter a network monitoring mode of operation to handoff wireless terminals which were using the access point as an attachment point to another access point which will be in a communications mode of operation while the access point provided the handoff instruction is in the network monitoring mode of operation.

Figure 6:
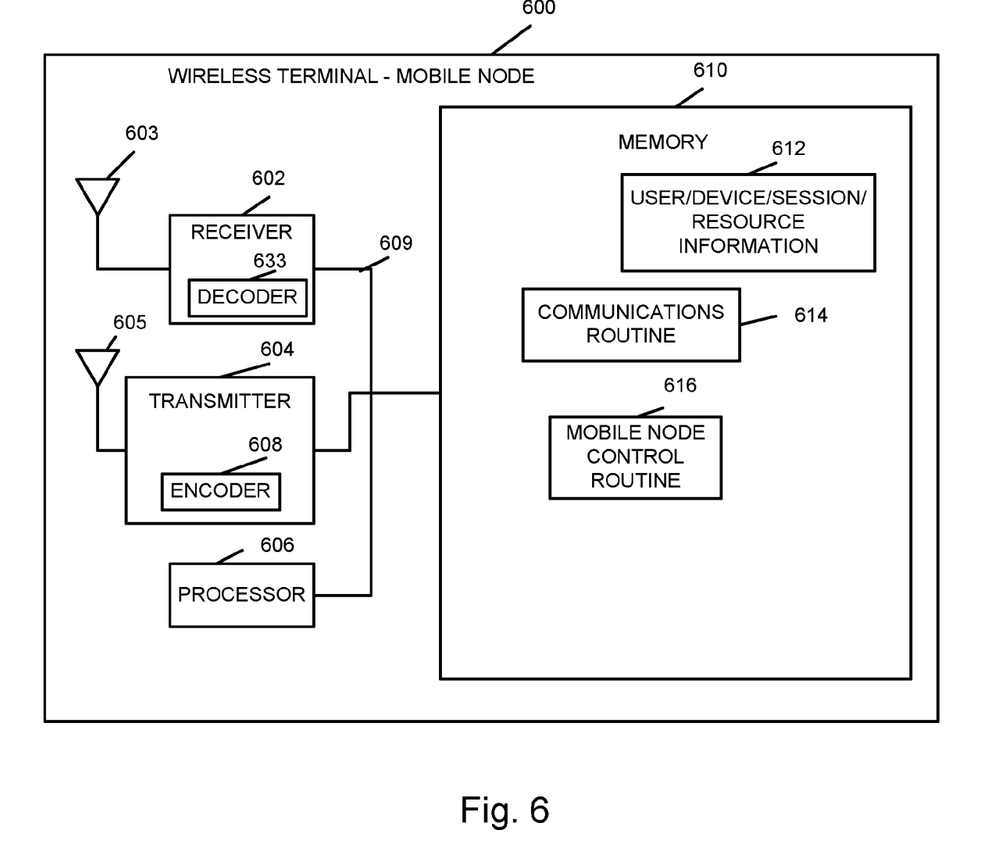
FIG. 6 illustrated an exemplary wireless terminal which may be used in the exemplary system of FIG. 1.

FIG. 6 illustrates an exemplary mobile node 600 implemented in accordance with the present invention. The mobile node 600 may be used as a mobile terminal (MT), e.g., mobile node 122, 124. The mobile node 600 includes receiver and transmitter antennas 603, 605 which are coupled to receiver and transmitter circuitry 602, 604 respectively. The receiver circuitry 602 includes a decoder 633 while the transmitter circuitry 604 includes an encoder 608. The receiver transmitter circuits 602, 604 are coupled by a bus 609 to a memory 610. Processor 606, under control of one or more routines stored in memory 610 causes the mobile node to operate in accordance with the methods of the present invention as described above. In order to control mobile node operation memory includes communications routine 614, and mobile node control routine 616. The mobile node routine is responsible for insuring that the mobile node operates in accordance with the methods of the present invention and performs the steps described above in regard to mobile node operations. The memory 610 also includes user/device/session/resource information which may be accessed and used to implement the methods of the present invention and/or data structures used to implement the invention.

Figure 7:
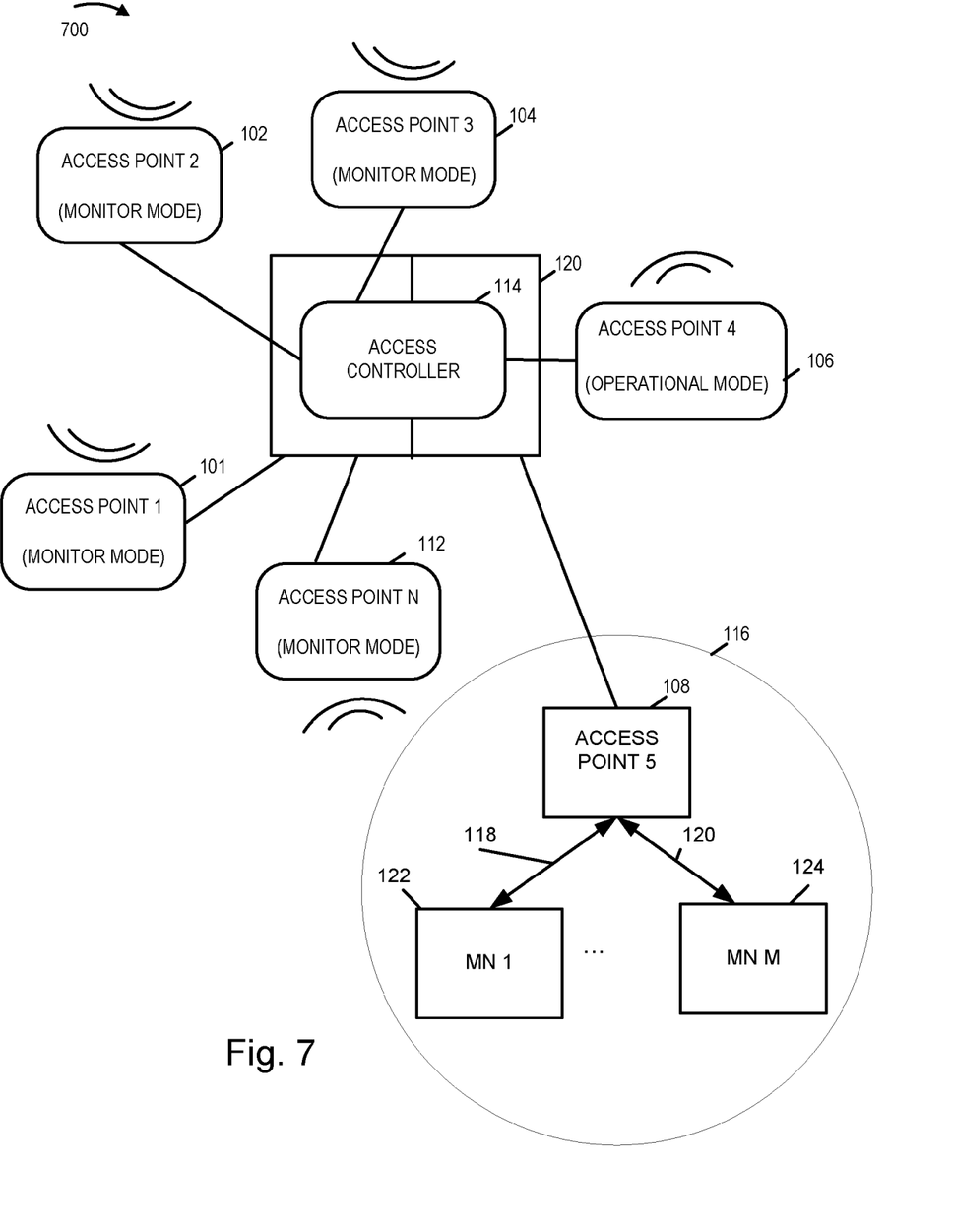
FIG. 7 illustrates an exemplary system in which one access point is in an operational mode transmitting signals and in which several access points are operating in a network monitoring mode measuring signals from the access point operating in operational mode.

FIG. 7 illustrates a system similar to that shown in FIG. 2 but with wireless terminals also shown. In FIG. 7 access points 4 and 5 operate in a communications e.g., operational, mode while first, second, third and Nth access points 101, 102, 104, 112 monitor and measure signals received from the access points 106, 108 operating in operation mode and from the wireless terminals 122, 124 communicating therewith. In FIG. 7 reference number 116 illustrates the coverage region of access point 5 108 while lines 118, 120 represent active wireless communications links between MN 1 122 and access point 5 108 and between MN M 124 and access point 5 108. Note that active communication continues in with respect to access points 4 and 5 which operate in the communications mode while the access points operating in network monitoring mode monitor for signals without transmitting to wireless terminals during network monitoring mode. Thus, during network monitoring mode, access points 101, 102, 104 do not have any wireless terminals with dedicated uplink traffic channels while access points 4 and 5 operating in communications mode may have multiple wireless terminals with dedicated uplink channel resources.

Figure 8:
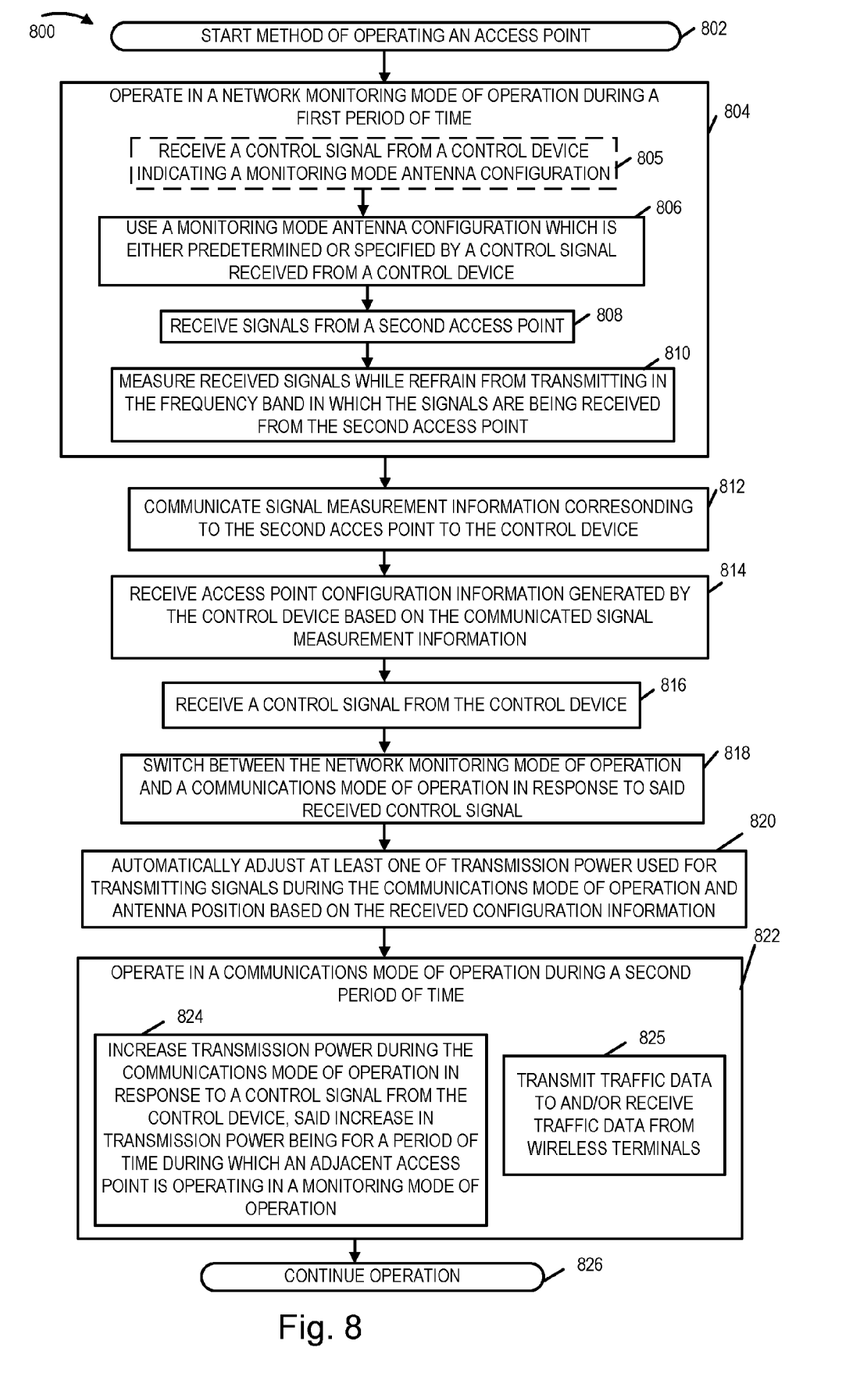
FIG. 8 is a flowchart illustrating the steps of an exemplary method of operating an access point, in accordance with one exemplary embodiment.

FIG. 8 is a flowchart 800 illustrating the steps of an exemplary method of operating an access point, in accordance with one exemplary embodiment. The exemplary method can be implemented by any of the access points, e.g., access point 102, shown in the system 100 of FIG. 2. At different points during the method of FIG. 8, the access node operates in a network monitoring mode of operation and in a communications mode of operation. While network monitoring is shown as being performed first, this need not be the case. The mode of operation at a particular point in time may be controlled by a schedule or a command received by a control device 500. Accordingly, the ordering of steps and modes of operation shown in FIG. 8 should be considered exemplary and it understood that the steps might be performed in a different order than what is shown.

The exemplary method starts in step 802 where the access point 102 is powered on and initialized. Operation proceeds from start step 802 to step 804 in which access point 102 operates in a network monitoring mode of operation during a first period of time. Step 804 includes steps 805, 806, 808 and 810, one or more of which are performed in some embodiments. In optional step 805, the access point 102 receives a control signal indicating a monitoring mode antenna configuration to be used during the network monitoring mode of operation, from a control device, e.g., access controller 114. The antenna patter used for monitoring may be changed at different point during the monitoring providing information relating to different directions relative to the position of the monitoring access point. In embodiments where optional step 805 is skipped, the monitoring mode antenna configuration may be predetermined and known to the access point implementing the method. In some embodiments the control device is one of: a central controller, a peer access point and a coordinating access point.

Operation proceeds during network monitoring mode from step 805 to 806 or beginnings with 806 in cases where step 805 is not performed. In step 806 the access point 102 configures the antenna according to the monitoring mode antenna configuration to be used during the network monitoring mode of operation. The antenna pattern is either predetermined or specified by the control signal received from the control device 114 as in step 805. The operation proceeds from step 806 to step 808 where the access point 102 receives one or more signals from a second access point which is being monitored. Signals from other access points being monitored may also be received. Operation proceeds from step 808 to step 810. In step 810 the access point 102 performs signal measurement operations on the received signals, while refraining from transmitting in the frequency band in which the signals are being received from the second access point. Thus, during the network monitoring mode of operation, signals are received while the access point performing monitoring refrains from transmitting to wireless terminals. The received signals may include, e.g., pilot signals, traffic data signals, etc. transmitted by the second access point or transmitted to the second access point. The signal measurements may include, e.g., measuring the signal strength corresponding to one or more of the received signals. In addition to signal strength measurements in some embodiments source and/or destination identifiers associated with the signals are detected and used to determine the source and/or target of the received signals.

Operation proceeds from step 804 which includes steps 805, 806, 808 and 810, to step 812. In step 812 the access point 102 communicates signal measurement information, e.g., information on the performed signal measurements, corresponding to the second access point and possibly other access points to the control device 114. Operation then proceeds from step 812 to step 816. In step 816 the access point receives a control signal from the control device 114. In the FIG. 8 example, the control signal instructs or otherwise controls the access point to switch from one mode to the other, e.g., from the network monitoring mode of operation to the communications mode of operation. Operation proceeds from step 816 to step 818 where the access point 102 switches from the network monitoring mode of operation to the communications mode of operation in response to the received control signal. It should be appreciated that the control device can also instruct the access point to switch back to the monitoring mode at some later point in time. Thus, the control device can instruct the access point to switch between modes of operation.

Operation proceeds from step 818 to step 820 in which the access point automatically adjusts at least one of: i) transmission power used for transmitting signals during the communications mode of operation and ii) antenna position based on received access point configuration information. The received configuration information may be based on information communicated to the control device from the access point and/or based on information communicated from other access points to the control device. The antenna position may refer to an antenna configuration suitable for use during the mode of operation in which the access point is going to operate. In some embodiments the monitoring mode antenna configuration is different from an antenna configuration used during the communications mode of operation.

Operation proceeds from step 820 to step 822. In step 822 the access point 102 starts operating in a communications mode of operation during a second period of time. Step 822 includes steps 824 and 825 which are performed during the second period of time when the access point operates in the communications mode of operation. It should be noted that the communications mode of operation has also been referred to as the operational mode in this application.

As discussed above, in some but not necessarily all embodiments when another node is going to enter into a monitoring mode of operation a neighboring access point may be instructed to increase its transmission power and thereby increase its coverage range. This allows an access point to make up for any gap in coverage that might otherwise result from the neighboring access point entering a monitoring mode of operation. In step 824 the access point 102 increases the transmission power, e.g., of the access point transmitter, in response to a control signal received from the control device, said increase in transmission power being for a period of time during which an adjacent access point is operating in a monitoring mode of operation.

For example, the control device 114 being aware of the operation mode schedule of the access points in the system, can send out a control signal to the access point 102 to increase the transmission power for the time period during which a neighboring access point, e.g., AP 104, is operating in a monitoring mode of operation. In step 825 the access point transmits traffic data to and/or receives traffic data from wireless terminals in the system while operating in said communications mode of operation. Access point operation continues in step 823 and it should be appreciated that the access point may switch back and forth between network monitoring and communications modes of operation according to a schedule and/or as instructed.

Figure 9:
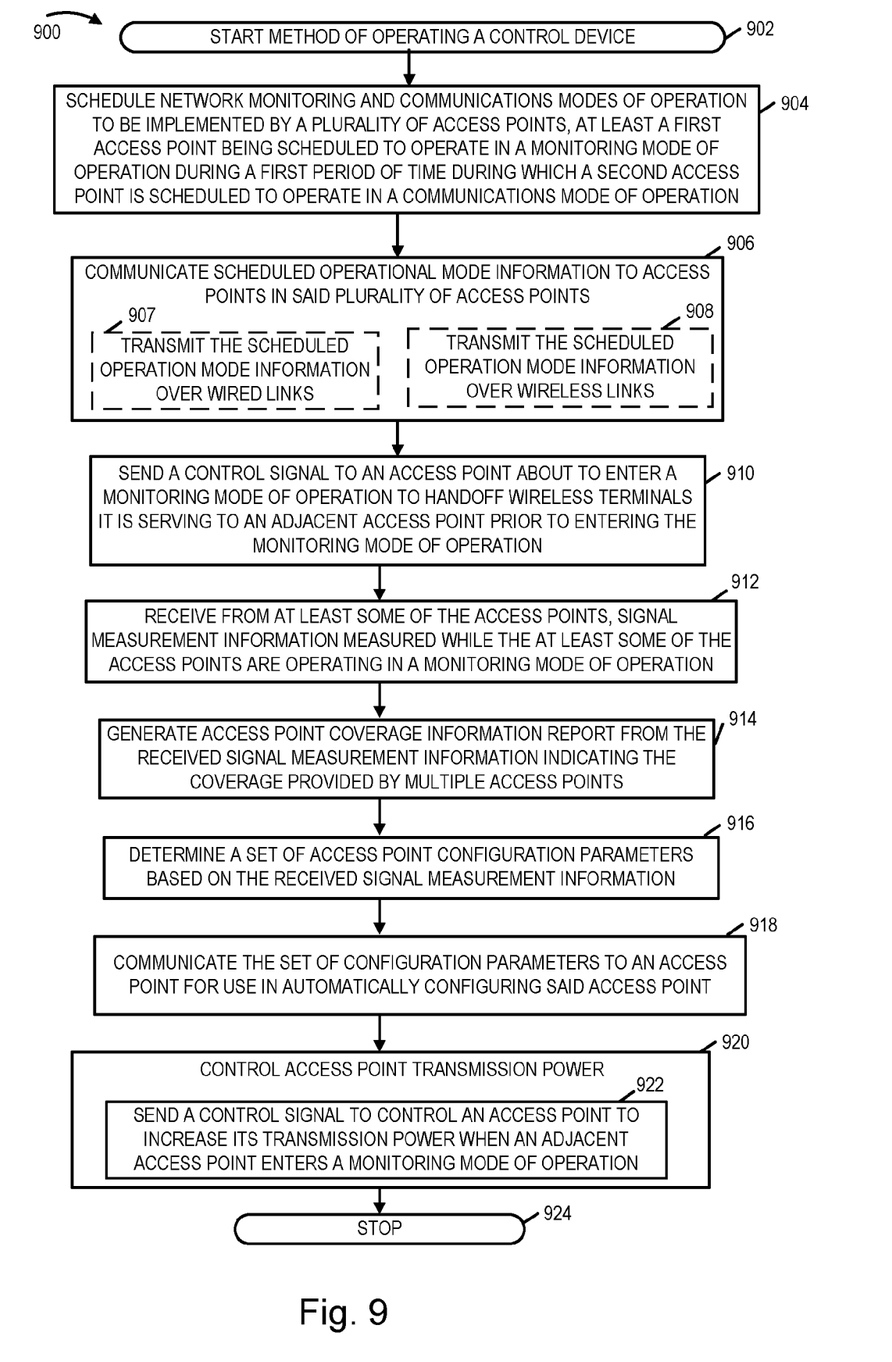
FIG. 9 is a flowchart illustrating the steps of an exemplary method of operating a control device, in accordance with one exemplary embodiment.

FIG. 9 is a 900 flowchart illustrating the steps of an exemplary method of operating a control device, in accordance with one exemplary embodiment. The exemplary method can be implemented by a control device such as, e.g., access controller 114 shown in the system 100 or the access controller 500 shown in FIG. 5. The exemplary method starts in step 902 where the control device 114 is initialized. Operation proceeds from start step 902 to step 904. In step 904, the control device 114 schedules network monitoring and communications modes of operation to be implemented by a plurality of access points, at least a first access point being scheduled to operate in a network monitoring mode of operation during a first period of time during which a second access point is scheduled to operate in a communications mode of operation. For example some access points in system 100, e.g., AP 1 101, AP 2 102 may be scheduled to operate in a network monitoring mode during a first period of time during which some other access points, e.g., AP 4 106, are scheduled to operate in a communications mode.

Operation proceeds from step 904 to step 906. In step 906 the control device 114 communicates scheduled operation mode information to access points in said plurality of access points. In some embodiments communicating the information in step 906 includes performing one of the steps 907 and 908. In step 907 the control device 114 transmits the scheduled operation mode information over wired links. In some other embodiments where step 907 is performed the control device transmits the scheduled operation mode information over wireless links. Operation proceeds from step 906 to step 910 where the control device 114 sends a control signal to an access point about to enter a network monitoring mode of operation to handoff wireless terminals it is serving to an adjacent access point prior to entering said network monitoring mode of operation.

Operation proceeds from step 910 to step 912. In step 912 the control device 114 receives from at least some of the access points, signal measurement information measured while said at least some of the access points are operating in the network monitoring mode of operation. The operation proceeds from step 912 to step 914 where the control device 114 generates access point coverage information report from the received signal measurement information indicating the coverage provided by multiple access points.

Operation proceeds from step 914 to step 916. In step 916 the control device 114 determines a set of access point configuration parameters, e.g., used to control an access point, based on the received measurement information. The operation proceeds from step 916 to step 918 wherein the control device 114 communicates the set of configuration parameters to an access point for use in automatically configuring the access point to which the set of configuration parameters are communicated. Operation proceeds from step 918 to step 920. In step 920 the control device 114 controls an access point transmission power which in some embodiments includes performing step 922. In step 922 a control signal is sent to control an access point to increase its transmission power when an adjacent access point enters a network monitoring mode of operation. In step 924, control device operation stops, e.g., when the control device is replaced or powered down. It should be appreciated that prior to stopping in step 924 the control device may control many different access nodes, at different points in time, to enter monitoring and/or communications modes of operation thereby enabling collection of system information which can be used to automatically control and configure access points as access points are added to or removed from the system.

In various embodiments the access points are implemented as femotcells. The automatic configuration techniques allow for femtocells to be added to or removed from a system with the system automatically reconfiguring one or more femtocells in the system based on the results of monitoring femtocell activity and/or the effect of removing or adding a femtocell to the system.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine or computer readable medium including machine or computer executable instructions for causing a machine, e.g., a computer and/or processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node.

The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

At least some of the methods and apparatus of various embodiments are applicable to a wide range of communications systems including many OFDM as well as non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM/OFDMA and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A non-transitory computer readable medium comprising computer executable instructions for controlling a control device to:
schedule network monitoring and communications modes of operation to be implemented by a plurality of access points, at least a first access point being scheduled to operate in a network monitoring mode of operation during a first period of time during which a second access point is scheduled to operate in a communications mode of operation;
communicate scheduled operational mode information to access points in said plurality of access points; and
control an access point to increase its transmission power when an adjacent access point enters a network monitoring mode of operation and operate with the increased transmission power while said adjacent access point is in said network monitoring mode of operation.

2. A control device comprising:
a processor;
a monitoring and communications scheduling module for scheduling network monitoring and communications modes of operation to be implemented by a plurality of access points, at least a first access point being scheduled by said monitoring and communications module during a first period of time to operate in a network monitoring mode of operation during which a second access point is scheduled to operate in a communications mode of operation;
a communications module for communicating scheduled operational mode information to access points in said plurality of access points; and
a handoff control module for causing an access point about to enter a network monitoring mode of operation to handoff wireless terminals it is serving to an adjacent access point prior to entering said network monitoring mode of operation.

3. A method of operating an access point comprising:
operating during a first period of time in a network monitoring mode of operation, operating in said network monitoring mode including:
measuring signals received from a second access point while refraining from transmitting in the frequency band in which said signals are being received from the second access point, said measuring being performed using a monitoring mode antenna configuration which is either predetermined or specified by a control signal received from a control device; and
operating during a second period of time in a communications mode of operation.

4. The method of claim 3, wherein said monitoring mode antenna configuration is different from an antenna configuration used during said communications mode of operation.

5. The method of claim 4, further comprising:
switching between said network monitoring mode of operation and said communications mode of operation in response to a control signal received from the control device.

6. The method of claim 3, wherein said antenna configuration is specified by said control signal, the method further comprising:
receiving said control signal; and
changing the antenna configuration to the configuration specified by said control signal.

7. The method of claim 5, further comprising:
communicating signal measurement information corresponding to said second access point to said control device.

8. The method of claim 7, further comprising:
receiving access point configuration information generated by said control device based on the communicated signal measurement information.

9. A method of operating an access point comprising:
operating during a first period of time in a network monitoring mode of operation, operating during said first period of time in the network monitoring mode of operation including measuring signals received from a second access point while refraining from transmitting in the frequency band in which said signals are being received from the second access point;
communicating signal measurement information corresponding to said second access point to a control device;

switching between said network monitoring mode of operation and a communications mode of operation in response to a control signal received from the control device;

receiving access point configuration information generated by said control device based on the communicated signal measurement information;

automatically adjusting at least an antenna position based on the received configuration information; and operating during a second period of time in the communications mode of operation.

10. A method of operating an access point comprising:

operating during a first period of time in a network monitoring mode of operation, operating during said first period of time in the network monitoring mode of operation including measuring signals received from a second access point while refraining from transmitting in the frequency band in which said signals are being received from the second access point;

switching between said network monitoring mode of operation and a communications mode of operation in response to a control signal received from a control device;

operating during a second period of time in the communications mode of operation; and increasing transmission power during said communications mode of operation in response to a control signal from the control device, said increase in transmission power being for a period of time during which an adjacent access point is operating in a network monitoring mode of operation.

11. An access point comprising:

a receiver for receiving signals; and a mode control module for controlling the access point to switch between a network monitoring mode of operation and a communications mode of operation; and a configuration control module for increasing transmission power during said communications mode of operation in response to a control signal, said increase in transmission power being for a period of time during which an adjacent access point is operating in a network monitoring mode of operation.

12. The access point of claim 11, further comprising:

a signal measurement module for measuring signals received from a second access point while refraining from transmitting in the frequency band in which said signals are being received from the second access point.

13. The access point of claim 12, further comprising:

a transmission control module for controlling said access point to refrain from transmitting in the frequency band in which said signals are being received from the second access point during said network monitoring mode of operation.

14. The access point of claim 13, further comprising:

an interface for communicating signal measurement information corresponding to said second access point to a control device.

15. The access point of claim 14, wherein said control device is one of: a peer access point, and a coordinating access point.

16. The access point of claim 14, wherein said configuration control module is configured to alter an access point antenna configuration based on access point configuration information received from said control device which was generated by said control device based on the communicated signal measurement information.

17. The access point of claim 16, wherein said configuration control module automatically adjusts antenna directivity based on the received configuration information.

18. A non-transitory computer readable medium comprising computer executable instructions which when executed control an access point to:

operate during a first period of time in a network monitoring mode of operation; and operate during a second period of time in a communications mode of operation; and increase transmission power during said communications mode of operation in response to a control signal, said increase in transmission power being for a period of time during which an adjacent access point is operating in a network monitoring mode of operation.

19. An access point comprising:

receiver means for receiving wireless signals; and mode control means for controlling the access point to switch between a network monitoring mode of operation and a communications mode of operation; and configuration means for increasing transmission power during said communications mode of operation in response to a control signal, said increase in transmission power being for a period of time during which an adjacent access point is operating in a network monitoring mode of operation.

20. The access point of claim 19, further comprising:

signal measurement means for measuring signals received from a second access point while refraining from transmitting in the frequency band in which said signals are being received from the second access point.

21. The access point of claim 20, further comprising:

transmission control means for controlling said access point to refrain from transmitting in the frequency band in which said signals are being received from the second access point during said network monitoring mode of operation.

22. A control device comprising:

a processor;

a monitoring and communications scheduling module for scheduling network monitoring and communications modes of operation to be implemented by a plurality of access points, at least a first access point being scheduled by said monitoring and communications module during a first period of time to operate in a network monitoring mode of operation during which a second access point is scheduled to operate in a communications mode of operation;

a communications module for communicating scheduled operational mode information to access points in said plurality of access points; and a power control module for controlling access point transmission power, said power control module causing an access point to increase its transmission power when an adjacent access point enters a network monitoring mode of operation.

23. The control device of claim 22, wherein said control device is one of:

a central controller, a peer access point, and a coordinating access point.

24. The control device of claim 22, wherein said control device is coupled to said access points by wired links.

25. The control device of claim 22, wherein said control device is coupled to said access points by wireless links.

26. The control device of claim 22, further comprising:
a receiver for receiving, from at least some of said access points, signal measurement information measured while said at least some of said access points are operating in a network monitoring mode of operation.

27. The control device of claim 26, further comprising:
an analysis module for generating access point coverage information report from received signal measurement information indicating the coverage provided by multiple access points.

28. The control device of claim 27, further comprising:
a configuration control module for determining a set of access point configuration parameters based on the received signal measurement information; and
wherein said communication module is also configured to communicate the set of configuration parameters to an access point for use in automatically configuring said access point.

29. A control device comprising:
a monitoring and communications scheduling module for scheduling network monitoring and communications modes of operation to be implemented by a plurality of access points, at least a first access point being scheduled by said monitoring and communications module during a first period of time to operate in a network monitoring mode of operation during which a second access point is scheduled to operate in a communications mode of operation;
a communications module for communicating scheduled operational mode information to access points in said plurality of access points;
a receiver for receiving from at least some of said access points signal measurement information measured while said at least some of said access points are operating in a network monitoring mode of operation;
a configuration control module for determining a set of access point configuration parameters based on the received signal measurement information, said communication module being configured to communicate the set of configuration parameters to an access point for use in automatically configuring said access point; and
a power control module for controlling access point transmission power, said power control module causing an access point to increase its transmission power when an adjacent access point enters a network monitoring mode of operation.

30. The control device of claim 29, further comprising:
a handoff control module for causing an access point about to enter a network monitoring mode of operation to handoff wireless terminals it is serving to an adjacent access point prior to entering said network monitoring mode of operation.

31. A method of operating a control device comprising:
scheduling network monitoring and communications modes of operation to be implemented by a plurality of access points, at least a first access point being scheduled to operate in a network monitoring mode of operation during a first period of time during which a second access point is scheduled to operate in a communications mode of operation; and
communicating scheduled operational mode information to access points in said plurality of access points; and
sending a handoff control signal to an access point about to enter a network monitoring mode of operation to control said access point about to enter the network monitoring mode to handoff wireless terminals it is serving to an adjacent access point prior to entering said network monitoring mode of operation.

32. The method of claim 31, wherein said control device is one of:
a central controller, a peer access point, and a coordinating access point.

33. The method of claim 31, wherein communicating scheduled operational mode information to access points includes:
transmitting the scheduled operation mode information over wired links.

34. The method of claim 31, wherein communicating scheduled operational mode information to access points includes:
transmitting the scheduled operation mode information over wireless links.

35. The method of claim 31, further comprising:
receiving from at least some of said access points signal measurement information measured while said at least some of said access points are operating in a network monitoring mode of operation.

36. The method of claim 35, further comprising:
generating access point coverage information report from received signal measurement information indicating the coverage provided by multiple access points.

37. The method of claim 36, further comprising:
determining a set of access point configuration parameters based on the received signal measurement information; and
communicating the set of configuration parameters to an access point for use in automatically configuring said access point.

38. A method of operating a control device comprising:
scheduling network monitoring and communications modes of operation to be implemented by a plurality of access points, at least a first access point being scheduled to operate in a network monitoring mode of operation during a first period of time during which a second access point is scheduled to operate in a communications mode of operation; and
communicating scheduled operational mode information to access points in said plurality of access points;
receiving from at least some of said access points signal measurement information measured while said at least some of said access points are operating in a network monitoring mode of operation;
determining a set of access point configuration parameters based on the received signal measurement information;
communicating the set of configuration parameters to an access point for use in automatically configuring said access point; and
controlling access point transmission power, said controlling access point transmission power including sending a control signal to control an access point to increase its transmission power when an adjacent access point enters a network monitoring mode of operation.

39. The method of claim 38, further comprising:
sending a control signal to an access point about to enter a network monitoring mode of operation to handoff wireless terminals it is serving to an adjacent access point prior to entering said network monitoring mode of operation.

40. A method of operating an access point comprising:
operating during a first period of time in a network monitoring mode of operation, operating in a network monitoring mode including measuring signals received from a second access point while refraining from transmitting in the frequency band in which said signals are being received from the second access point;
switching between a network monitoring mode of operation and a communications mode of operation in response to a control signal received from a control device;
and
operating during a second period of time in the communications mode of operation; and
wherein said control device is one of: a peer access point and a coordinating access point.

* * * * *